US012016033B2

(12) United States Patent
Gao et al.

(10) Patent No.: US 12,016,033 B2
(45) Date of Patent: Jun. 18, 2024

(54) MULTI-TRP TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 445 days.

(21) Appl. No.: 17/311,529

(22) PCT Filed: Dec. 10, 2018

(86) PCT No.: PCT/CN2018/120135

§ 371 (c)(1),
(2) Date: Jun. 7, 2021

(87) PCT Pub. No.: WO2020/118494

PCT Pub. Date: Jun. 18, 2020

(65) Prior Publication Data

US 2022/0022232 A1 Jan. 20, 2022

(51) Int. Cl.
*H04W 72/23* (2023.01)
*H04W 48/02* (2009.01)

(52) U.S. Cl.
CPC ........... *H04W 72/23* (2023.01); *H04W 48/02* (2013.01)

(58) Field of Classification Search
CPC ..... H04W 48/02; H04W 76/15; H04W 76/38; H04W 72/0453; H04L 5/001; H04L 5/0035; H04L 5/0098
See application file for complete search history.

(56) References Cited

U.S. PATENT DOCUMENTS

2019/0132109 A1* 5/2019 Zhou ........................ H04L 5/001
2019/0349060 A1* 11/2019 Liao ..................... H04B 7/0695
(Continued)

FOREIGN PATENT DOCUMENTS

CN 108810957 A 11/2018
CN 108886787 A 11/2018
(Continued)

OTHER PUBLICATIONS

Communication dated Aug. 2, 2022 from the Japanese Patent Office in Japanese Application No. 2021-532985.
(Continued)

*Primary Examiner* — Ayaz R Sheikh
*Assistant Examiner* — Tarell A Hampton
(74) *Attorney, Agent, or Firm* — Sughrue Mion, PLLC

(57) ABSTRACT

Embodiments of the present disclosure provide method, device and computer readable medium for multi-TRP transmission. In example embodiments, a method implemented at a terminal device is provided. The method comprises, in response to a first bandwidth part (BWP) being configured for first and second Transmission and Reception Points (TRPs) in communication with the terminal device and different Physical Downlink Control Channels (PDCCHs) being configured for the first and second TRPs, receiving, from the first TRP, a first PDCCH in a first slot. The method further comprises, in response to the first PDCCH indicating BWP switching from the first BWP to a second BWP on the first TRP, ensuring BWPs on the first and second TRPs to be aligned. In this way, BWPs for multiple TRPs can be aligned in multi-PDCCH based multi-TRP transmission.

15 Claims, 5 Drawing Sheets

(56) References Cited

U.S. PATENT DOCUMENTS

| | | | | |
|---|---|---|---|---|
| 2020/0029331 | A1* | 1/2020 | Xu | H04L 5/0053 |
| 2020/0288494 | A1* | 9/2020 | Heo | H04W 72/20 |
| 2021/0076445 | A1* | 3/2021 | Tsai | H04W 74/0833 |
| 2021/0314955 | A1* | 10/2021 | Zhang | H04L 5/0053 |

FOREIGN PATENT DOCUMENTS

| | | | | |
|---|---|---|---|---|
| CN | 108886804 | A | 11/2018 | |
| CN | 111278117 | A * | 6/2020 | H04B 7/024 |
| EP | 3 563 511 | B1 | 6/2020 | |
| EP | 3 806 569 | A1 | 4/2021 | |
| WO | 2018/144873 | A1 | 8/2018 | |
| WO | 2018/194352 | A1 | 10/2018 | |

OTHER PUBLICATIONS

Vivo, "Remaining issues on BWP operation", 3GPP TSG RAN WG1 Meeting #92, R1-1801544, 2018 (5 pages total).

MediaTek Inc., "Enhancements on multi-TRP/panel transmission", 3GPP TSG RAN WG1 Meeting #95, R1-1812349, 2018 (3 pages total).

Intel Corporation, "Remaining issues for carrier aggregation and bandwidth parts", 3GPP TSG-RAN WG1 Meeting #95, R1-1812473, 2018, pp. 1-3 (3 pages total).

MediaTek Inc., "Summary of Bandwidth Part Remaining Issues", 3GPP TSG RAN WG1 Meeting #95, R1-1814155, 2018 (12 pages total).

"Draft CR on simultaneous active BWP switchings within a cell or across cells", 3GPP TSG RAN WG1 Meeting #95, Nov. 12-16, 2018, 4 pages, R1-1814039.

"Enhancements on multi-TRP/panel transmission", 3GPP TSG RAN WG1 Meeting #95, Nov. 12-16, 2018, 9 pages, R1-1812243.

International Search Report of PCT/CN2018/120135 dated Sep. 10, 2019 [PCT/ISA/210].

Written Opinion of PCT/CN2018/120135 dated Sep. 10, 2019 [PCT/ISA/237].

Chinese Office Action dated Jan. 9, 2024 in Application No. 201880100091.2.

* cited by examiner

MULTI-TRP TRANSMISSION

CROSS REFERENCE TO RELATED APPLICATIONS

This application is a National Stage of International Application No. PCT/CN2018/120135 filed on Dec. 10, 2018.

TECHNICAL FIELD

Embodiments of the present disclosure generally relate to wireless communication, and in particular, to a method, a device and a computer readable medium for multi-Transmission and Reception Point (multi-TRP) transmission.

BACKGROUND

The latest developments of the Third Generation Partnership Project (3GPP) standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by 3GPP to meet new requirements associated with latency, reliability, security, scalability (e.g., with Internet of Things (IoT)), and other requirements.

Recently, the study of NR system was approved, which will consider frequency ranges up to 100 GHz with the objective of a single technical framework addressing all defined usage scenarios, requirements and deployment scenarios, including enhanced mobile broadband, massive machine-type-communications, and ultra-reliable and low latency communications. In NR, a network device (for example, a next generation NodeB (gNB)) may be equipped with multiple Transmission and Reception Points (TRPs) or antenna panels. That is, the network device can communicate with a terminal device (for example, a user equipment (UE)) via one or more of the multiple TRPs or antenna panels. Different Physical Downlink Control Channels (PDCCHs) may be configured for the multiple TRPs or antenna panels respectively. For multi-TRP/panel transmission, considering complexity and feasibility, it is preferable to align bandwidth parts (BWPs) used for different TRPs/panels. However, the active BWP can be dynamically switched based on downlink control information (DCI) transmitted in PDCCH. In case of multi-PDCCH based multi-TRP transmission, especially for non-ideal backhaul, if one PDCCH from one TRP indicate a BWP change, how to handle the BWPs used for other TRPs has not been specified yet.

SUMMARY

In general, example embodiments of the present disclosure provide a method, a device and a computer readable medium for multi-TRP transmission.

In a first aspect, there is provided a method implemented at a terminal device. The method comprises: in response to a first bandwidth part (BWP) being configured for first and second Transmission and Reception Points (TRPs) in communication with the terminal device and different Physical Downlink Control Channels (PDCCHs) being configured for the first and second TRPs, receiving, from the first TRP, a first PDCCH in a first slot; and in response to the first PDCCH indicating BWP switching from the first BWP to a second BWP on the first TRP, ensuring BWPs on the first and second TRPs to be aligned.

In a second aspect, there is provided a terminal device. The terminal device comprises a processor and a memory coupled to the processor. The memory stores instructions that when executed by the processor, cause the terminal device to perform actions. The actions comprise: in response to a first bandwidth part (BWP) being configured for first and second Transmission and Reception Points (TRPs) in communication with the terminal device and different Physical Downlink Control Channels (PDCCHs) being configured for the first and second TRPs, receiving, from the first TRP, a first PDCCH in a first slot; and in response to the first PDCCH indicating BWP switching from the first BWP to a second BWP on the first TRP, ensuring BWPs on the first and second TRPs to be aligned.

In a third aspect, there is provided a computer readable medium having instructions stored thereon. The instructions, when executed on at least one processor, cause the at least one processor to carry out the method according to the first aspect of the present disclosure.

In a fourth aspect, there is provided a computer program product that is tangibly stored on a computer readable storage medium. The computer program product includes instructions which, when executed on at least one processor, cause the at least one processor to carry out the method according to the first aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
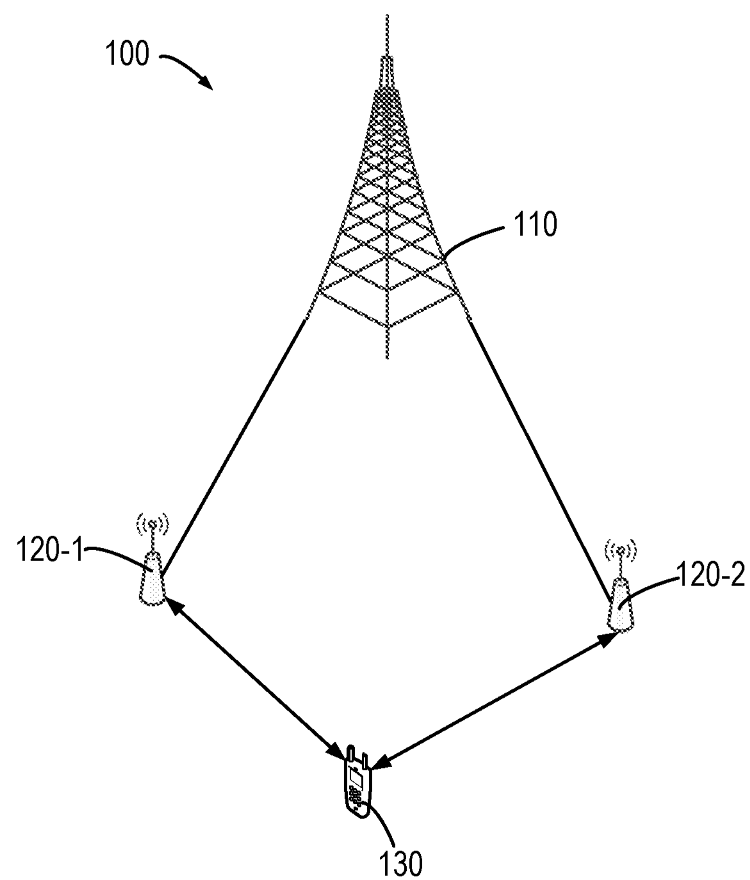
FIG. 1 shows an example communication network in which embodiments of the present disclosure can be implemented.

FIG. 1 illustrates an example communication network 100 in which embodiments of the present disclosure can be implemented. As shown in FIG. 1, the network 100 includes a network device 110, which is coupled with two TRPs/panels 120-1 and 120-2 (collectively referred to as TRPs 120 or individually referred to as TRP 120). The network 100 also includes a terminal device 130 served by the network device 110. It is to be understood that the number of network devices, terminal devices and TRPs as shown in FIG. 1 is only for the purpose of illustration without suggesting any limitations. The network 200 may include any suitable number of devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 130.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like.

As used herein, the term "TRP" refers to an antenna array (with one or more antenna elements) available to the network device located at a specific geographical location. For example, a network device may be coupled with multiple TRPs in different geographical locations to achieve better coverage.

As shown in FIG. 1, the network device 110 may communicate with the terminal device 130 via the TRPs 120-1 and 120-2. In the following text, the TRP 120-1 may be also referred to as the first TRP, while the TRP 120-2 may be also referred to as the second TRP. Each of the TRPs 120 may provide a plurality of beams for communication with the terminal device 130.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, for multi-TRP transmission, different PDCCHs may be configured for a plurality of TRPs or antenna panels in communication with the terminal device respectively. However, the active BWP can be dynamically switched based on downlink control information (DCI) transmitted in PDCCH.

In 3GPP specifications, dynamic BWP switching based on DCI has been specified as below. If a terminal device detects a DCI format 1_1 indicating an active downlink (DL) BWP change for a cell, the terminal device is not required to receive or transmit in the cell during a time duration from the end of the third symbol of a slot where the terminal device receives the PDCCH that includes the DCI format 1_1 in a scheduling cell until the beginning of a slot indicated by the slot offset value of the time domain resource assignment field in the DCI format 1_1. If a terminal device detects a DCI format 0_1 indicating an active uplink (UL) BWP change for a cell, the terminal device is not required to receive or transmit in the cell during a time duration from the end of the third symbol of a slot where the terminal device receives the PDCCH that includes the DCI format 0_1 in the scheduling cell until the beginning of a slot indicated by the slot offset value of the time domain resource assignment field in the DCI format 0_1.

Figure 2A:
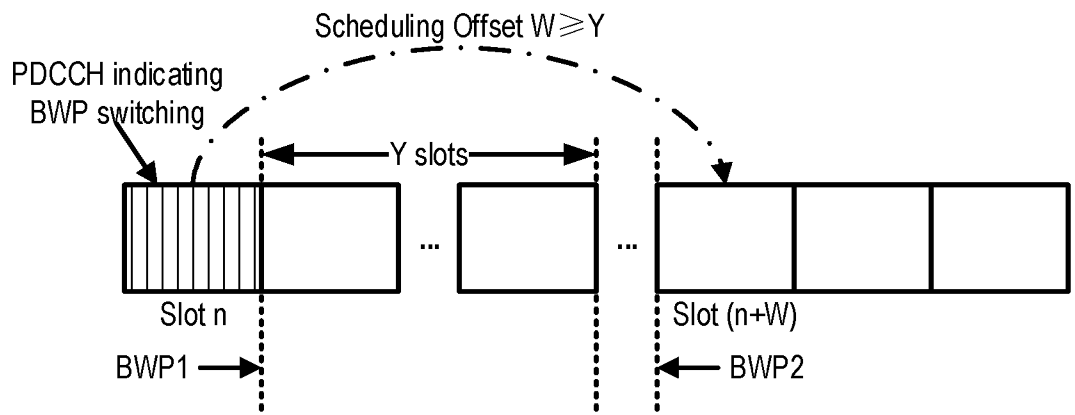
FIG. 2A illustrates an example of dynamic BWP switching.

FIG. 2A illustrates an example of dynamic BWP switching. As shown in FIG. 2A, the terminal device receives a PDCCH in slot n, which indicate BWP switching from BWP1 to BWP2. The terminal device is not required to receive or transmit during Y (where $Y \geq 1$) slots immediately after slot n until the beginning of slot $(n+W)$ indicated by the scheduling offset W, where $W \geq Y$ and $Y \geq 1$. In slot $(n+W)$, BWP1 is switched to BWP2.

In 3GPP specifications, it has also specified that, for a cell where a terminal device changes an active DL BWP due to a BWP inactivity timer expiration and for accommodating a delay in the active DL BWP change or the active UL BWP change required by the terminal device, the terminal device is not required to receive or transmit in the cell during a time duration from the beginning of a sub-frame for Frequency Range (FR) 1, or of half of a sub-frame for FR2, that is immediately after the BWP inactivity timer expires until the beginning of a slot where the terminal device can receive or transmit.

Figure 2B:
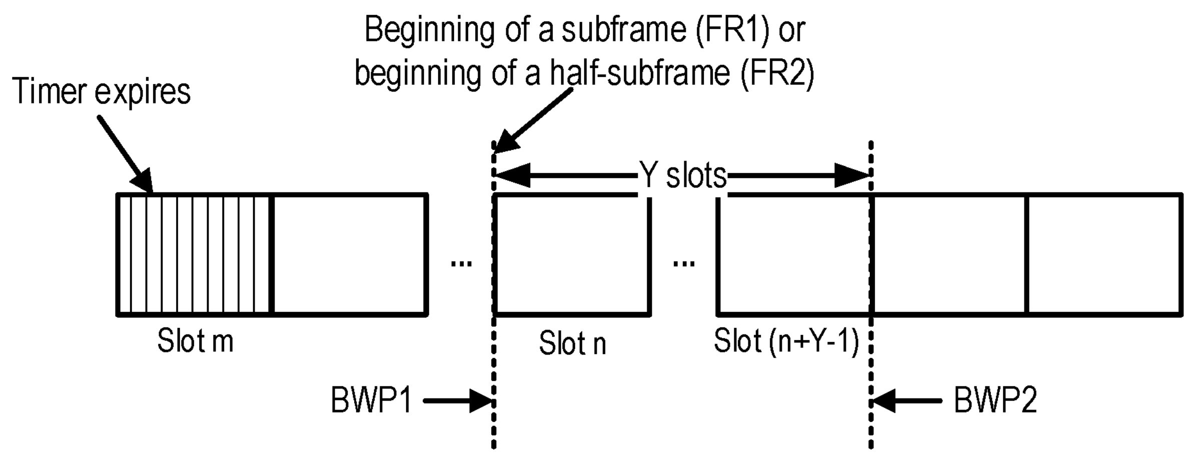
FIG. 2B illustrates another example of dynamic BWP switching.

FIG. 2B illustrates another example of dynamic BWP switching. As shown in FIG. 2B, the BWP inactivity timer expires in Slot m. The UE is not required to receive or transmit during Y (where $Y \geq 1$) slots from the beginning of a sub-frame for FR1 or the beginning of a half-subframe for FR2. After Slot $(n+Y-1)$, BWP1 is switched to BWP2.

Figure 3:
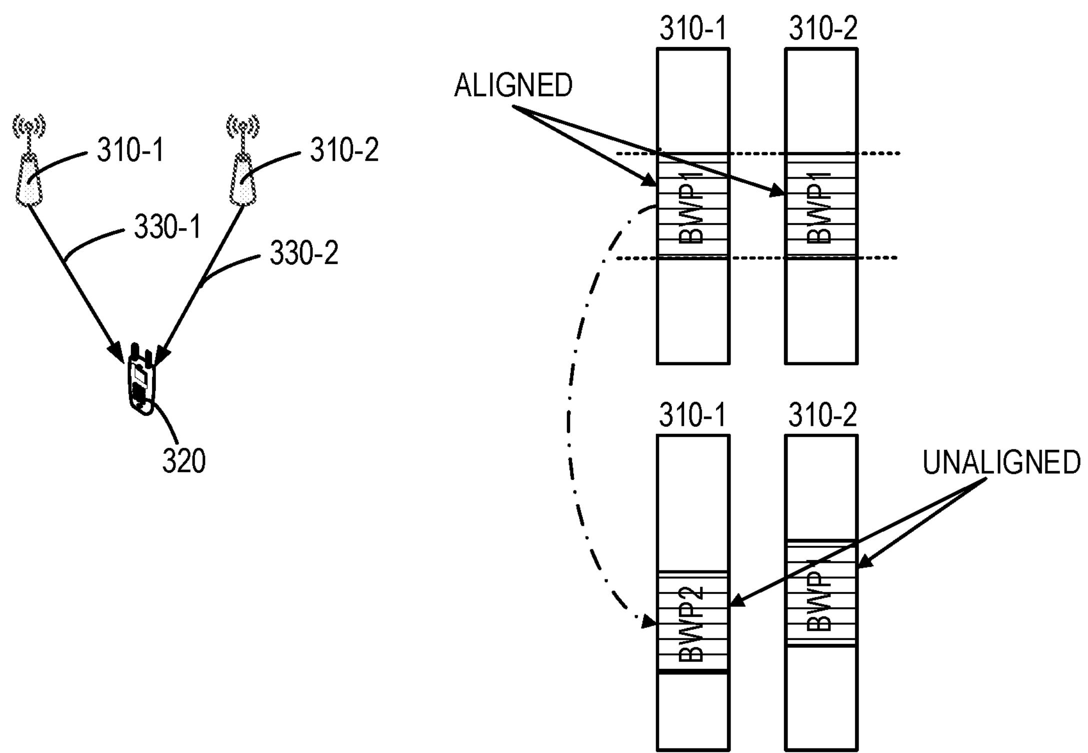
FIG. 3 illustrates an example of dynamic BWP switching in multi-PDCCH based multi-TRP transmission.

For multi-TRP/panel transmission, considering complexity and feasibility, it is preferable to align BWPs used for different TRPs/panels. However, in case of multi-PDCCH based multi-TRP transmission, it can be seen that if the terminal device receives a PDCCH from one TRP indicating BWP switching while failing to receive a PDCCH from another TRP indicating the same BWP switching in the same slot, BWPs used for these two TRPs may be unaligned. FIG. 3 shows an example of such scenario.

FIG. 3 shows two TRPs 310-1 and 310-2 in communication with a terminal device 320. PDCCH 330-1 may be configured for the TRP 310-1 and PDCCH 330-2 may be configured for the TRP 310-2. An aligned BWP (that is, BWP1) may be configured for both of the TRPs 310-1 and 310-2. For example, the terminal device 320 may receive, from the TRP 310-1, the PDCCH 330-1 indicating a BWP change from BWP1 to BWP2. However, due to the ideal backhaul, the terminal device 320 may not receive, from the TRP 310-2, the PDCCH 330-2 indicating the same BWP change. If the BWP used for the TRP 310-1 is switched from BWP1 to BWP2 while the BWP used for the TRP 310-2 is not switched, BWPs on the two TRPs 310-1 and 310-2 may be unaligned, as shown in FIG. 3. Different BWPs for different TRPs will increase the operational complexity of the terminal device.

In order to solve the above technical problems and potentially other technical problems in conventional solutions, embodiments of the present disclosure provide a solution for multi-TRP transmission. This solution specifies some assumptions for BWP switching in multi-PDCCH based multi-TRP/panel transmission, so as to ensure BWPs for multiple TRPs to be aligned.

Figure 4:
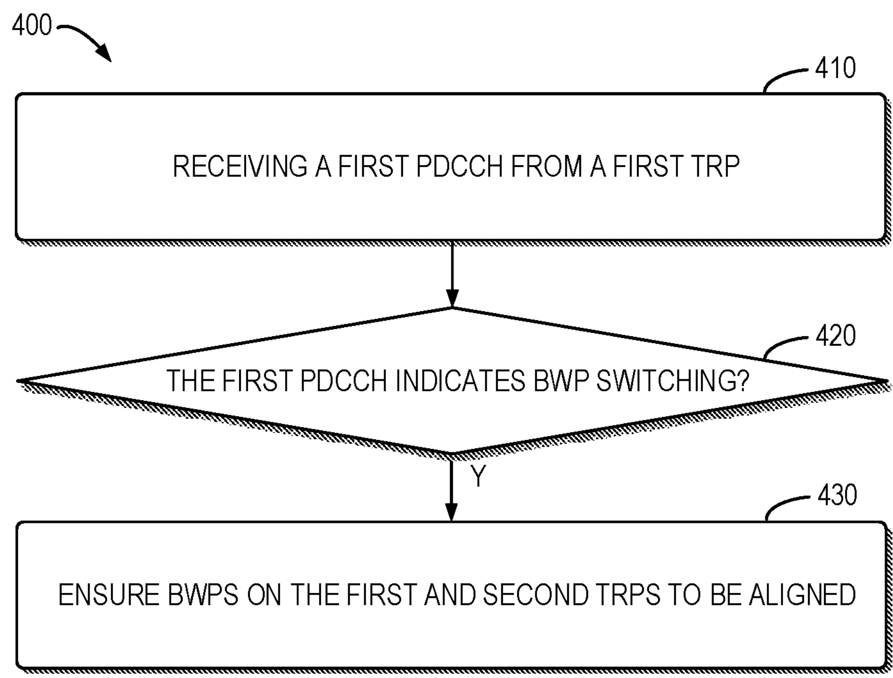
FIG. 4 illustrates a flowchart of an example method for multi-TRP transmission in accordance with some embodiments of the present disclosure.

Principles and implementations of the present disclosure will be described in detail below with reference to FIG. 4, which shows a method 400 for multi-TRP transmission according to some embodiments of the present disclosure. For example, the method 400 can be implemented at the terminal device 130 as shown in FIG. 1. It is to be understood that the method 400 may include additional blocks not shown and/or may omit some blocks as shown, and the scope of the present disclosure is not limited in this regard. For the purpose of discussion, the method 400 will be described from the perspective of the terminal device 130 with reference to FIG. 1.

At block 410, in response to a first BWP being configured for the first and second TRPs 120-1 and 120-2 in communication with the terminal device 130, and different PDCCHs being configured for the first and second TRPs 120-1 and 120-2 respectively, the terminal device 130 receives a first PDCCH from the first TRP 120-1 in a first slot. In some embodiments, for example, the terminal device 130 may receive DCI from the first TRP 120-1 in the first slot.

At block 420, the terminal device 130 determines if the first PDCCH received from the first TRP 120-1 indicates BWP switching from the first BWP to a second BWP. In some embodiments, the terminal device 130 may check a BWP indicator field included in the DCI, so as to determine if the DCI indicates a BWP change.

In some embodiments, the first BWP may be an UL BWP. The terminal device 130 may receive DCI format 0_1 from the first TRP 120-1, which may include a BWP indicator field indicating an active UL BWP. If the active UL BWP indicated by the BWP indicator field is different from the first BWP, the terminal device 130 may determine that the BWP switching is indicated. In this case, the active UL BWP may be referred to as the second BWP.

In some embodiments, the first BWP may be an DL BWP. The terminal device 130 may receive DCI format 1_1 from the first TRP 120-1, which may include a BWP indicator field indicating an active DL BWP. If the active DL BWP indicated by the BWP indicator field is different from the first BWP, the terminal device 130 may determine that the BWP switching is indicated. In this case, the active DL BWP may be referred to as the second BWP.

At block 430, in response to determining that the first PDCCH indicating the BWP switching from the first BWP to the second BWP, the terminal device 130 ensures BWPs on the first and second TPRs 120-1 and 120-2 to be aligned.

In some embodiments, if only one PDCCH indicates that the BWP on one TRP (such as, the TRP 120-1) is to be switched, the terminal device 130 may assume to fallback to singe TRP (that is, the TRP 120-1) transmission, for example, until receiving signaling to configure multi-PDCCH based multi-TRP/panel transmission on an aligned BWP (also referred to as a “third BWP”). That is, if the terminal device 130 only receives the first PDCCH from the TRP 120-1 indicating the BWP switching but fails to receive a second PDCCH indicating the same BWP switching from the second TRP 120-2 in the same slot as the first PDCCH, the terminal device 130 may switch the first BWP used for communication between the first TRP and the terminal device to the second BWP, for example, after a certain period of time (such as, Y slots as shown in FIGS. 2A and 2B). In some embodiments, the terminal device 130 may suspend or terminate communication between the second TRP 120-2 and the terminal device 130. In response to receiving signaling to configure the third BWP for both of the first and second TRPs 120-1 and 120-2, the terminal device 130 may resume the communication between the second TRP and the terminal device on the third BWP.

Figure 5:
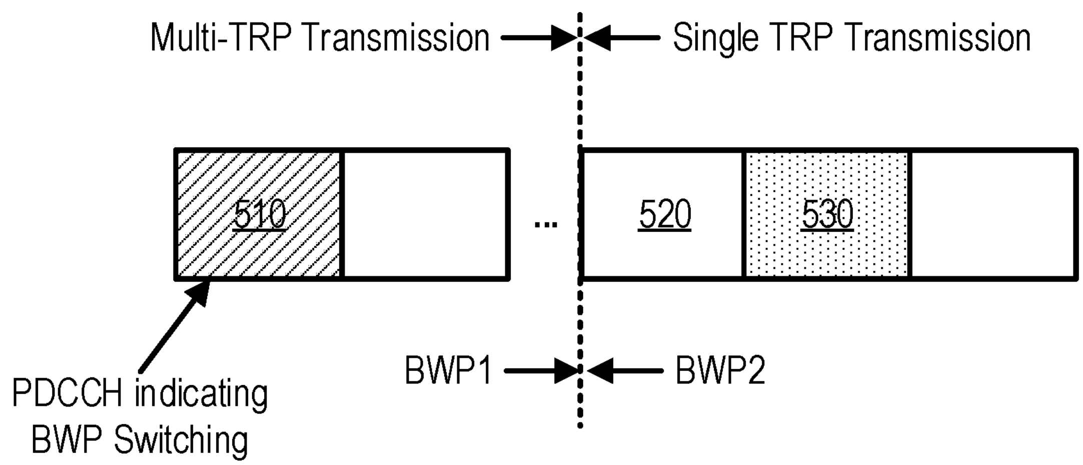
FIG. 5 shows an example of embodiments of the present disclosure.

FIG. 5 shows an example of such embodiments. As shown in FIG. 5, in slot 510, the terminal device 130 receives the first PDCCH indicating the BWP switching from the first TRP 120-1. Starting from slot 520, the terminal device 130 may suspend or terminate communication with the second TRP 120-2 and fallback to single TRP (that is, the TRP 120-1) transmission. In addition, the BWP used for the first TRP 120-1 may be switched from BWP1 to BWP2. For example, in slot 530 subsequent to the slot 520, communication with the first TRP 120-1 may be performed on BWP2.

In some embodiments, if only one PDCCH indicates that the BWP on one TRP (such as, the TRP 120-1) is to be switched, the terminal device 130 may assume to suspend the PDCCH from another TRP (that is, the TRP 120-2) or transmissions on the other TRP. If a BWP inactivity timer is configured, the BWPs used for the first TRP 120-1 and the second TRP 120-2 may switch to a default BWP after the BWP inactivity timer expires. In response to the BWPs used for the first TRP 120-1 and the second TRP 120-2 being switched to the default BWP, the terminal device 130 may resume multi-PDCCH based multi-TRP/panel transmission. That is, in response to the expiration of the BWP inactivity timer, the terminal device 130 may resume the communication between the second TRP and the terminal device on the default BWP. In addition, the terminal device 130 may also switch the second BWP used for the first TRP 120-1 to the default BWP, such that BWPs on the first and second TRPs 120-1 and 120-2 are aligned.

In some embodiments, if only one PDCCH indicates that the BWP on one TRP (such as, the TRP 120-1) is to be switched in slot n, the terminal device 130 may assume to fallback to singe TRP (that is, the TRP 120-1) transmission from slot $n+Y_0$ until slot $n+Y_1$. In some embodiments, before slot n+$Y_0$, the terminal device 130 may not receive and/or transmit anything. For example, $Y_1$ may be configured or fixed, and $Y_0 <= Y_1$. In some embodiments, if only one PDCCH indicates that the BWP on one TRP (such as, the TRP 120-1) is to be switched in slot n, the terminal device 130 may not assume multi-TRP transmission from slot n+$Y_2$. For example, $Y_2$ may be configured or fixed. In some embodiments, $Y_1 <= Y_2$. In some embodiments, if only one PDCCH indicates that the BWP on one TRP (such as, the TRP 120-1) is to be switched in slot n, the terminal device 130 may not transmit and/or receive until slot n+$Y_0$. For example, $Y_0$ may be configured or fixed. In addition, the terminal device 130 may assume to fallback to single TRP transmission from slot n+$Y_0$ until slot n+$Y_1$. Further, the terminal device 130 may assume to resume multiple-TRP transmission from slot n+$Y_2$. For example, $Y_0 <= Y_1 <= Y_2$. In some embodiments, if the terminal device 130 only receives the first PDCCH from the TRP 120-1 indicating the BWP switching in slot n but fails to receive a second PDCCH indicating the same BWP switching from the second TRP 120-2 in the same slot as the first PDCCH, the terminal device 130 may switch the first BWP used for communication between the first TRP and the terminal device to the second BWP, for example, after a certain period of time (such as, $Y_0$ slots). In some embodiments, the terminal device 130 may suspend or terminate communication between the second TRP 120-2 and the terminal device 130 within a certain period of time $Y_1$ slots, for example, until slot n+$Y_1$. In some embodiments, the terminal device 130 may resume communication between the second TRP 120-2 and the terminal device 130 after a certain period of time $Y_2$ slots. That is, the terminal device 130 may resume the communication between the second TRP and the terminal device from slot n+$Y_2$. In some embodiments, $Y_0 <= Y_1 <= Y_2$.

Alternatively, in some embodiments, if the terminal device 130 is configured with multi PDCCH based multi-TRP/panel transmission, the terminal device 130 may ignore the BWP indicator field in DCI. That is, dynamic BWP switching may be disabled in this case. In some embodiments, if multi-PDCCH based multi-TRP/panel transmission is configured, the BWP indicator field in DCI may be omitted, so as to disable the dynamic BWP switching. For example, the omitted BWP indicator filed can be used to indicate a different transmission configuration indication (TCI) state.

Alternatively, in some embodiments, if the terminal device 130 is configured with multi PDCCH based multi-TRP/panel transmission, the terminal device 130 may not expect to receive multiple PDCCHs with different values of the BWP indicator field in a same slot. For example, if the terminal 130 receives different PDCCHs from different TRPs indicating different values of the BWP indicator field, the terminal device 130 may ignore these received PDCCHs.

In some embodiments, the terminal device 130 may only switch the BWP based on an indication from a fixed or configured PDCCH/control channel resource set (CORESET). For other PDCCHs/CORESETs, the BWP switching may follow the fixed or configured PDCCH/CORESET. For example, if the fixed or configured PDCCH is the first PDCCH received from the first TRP 120-1 and the first PDCCH indicates the BWP switching from the first BWP to the second BWP, the terminal device 130 may switch the aligned first BWP for the first and second TRPs 120-1 and 120-2 to the second BWP, such that the BWPs on the first TRP 120-1 and the second TRP 120-2 are still aligned.

Alternatively, in some embodiments, the terminal device 130 may only switch the BWP based on an indication from a fixed or configured PDCCH/CORESET. For other PDCCHs/CORESETs, the terminal device 130 may not detect whether BWP switching is indicated.

Alternatively, in some embodiments, the terminal device 130 may only switch the BWP based on an indication from a fixed or configured PDCCH/CORESET. If the terminal device 130 detects BWP switching from DCI included in the fixed or configured PDCCH/CORESET, the terminal device 130 may suspend and/or terminate the detection of BWP switching from other PDCCHs/CORESETs. For example, if the fixed or configured PDCCH is the first PDCCH received from the first TRP 120-1 and the first PDCCH indicates the BWP switching from the first BWP to the second BWP, the terminal device 130 may suspend and/or terminate reception of a second PDCCH from the second TRP 120-2 within a configured/fixed time period after the first PDCCH is received.

Alternatively, in some embodiments, the terminal device 130 may only switch the BWP based on an indication from a fixed or configured PDCCH/CORESET. If the terminal device 130 detects BWP switching from DCI included in the fixed or configured PDCCH/CORESET, the terminal device 130 may suspend or terminate the detection of other PDCCHs/CORESETs. For example, if the fixed or configured PDCCH is the first PDCCH received from the first TRP 120-1 and the first PDCCH indicates the BWP switching from the first BWP to the second BWP, the terminal device 130 may suspend or terminate reception of a second PDCCH from the second TRP 120-2 after the first PDCCH is received.

Alternatively, in some embodiments, the terminal device 130 may only switch the BWP based on an indication from a fixed or configured PDCCH/CORESET within a first fixed and/or predefined period of time, and the terminal device 130 may switch the BWP for multiple TRPs after a second fixed and/or predefined period of time. In some embodiments, if the terminal device 130 detects BWP switching from DCI included in the fixed or configured PDCCH/CORESET in slot n, the terminal device 130 may suspend and/or terminate the detection of other PDCCHs/CORESETs until slot n+$Y_1$. For example, if the fixed or configured PDCCH is the first PDCCH received from the first TRP 120-1 and the first PDCCH indicates the BWP switching from the first BWP to the second BWP, the terminal device 130 may suspend or terminate reception of a second PDCCH from the second TRP 120-2 after the first PDCCH is received until slot n+$Y_1$. In some embodiments, if the terminal device 130 detects BWP switching from DCI included in the fixed or configured PDCCH/CORESET in slot n, the terminal device 130 may start or resume the detection of other PDCCHs/CORESETs from slot n+$Y_2$. For example, if the fixed or configured PDCCH is the first PDCCH received from the first TRP 120-1 and the first PDCCH indicates the BWP switching from the first BWP to the second BWP, the terminal device 130 may start or resume reception of a second PDCCH from the second TRP 120-2 after slot n+$Y_2$. In some embodiments, $Y_0$, $Y_1$ and/or $Y_2$ may be fixed and/or configured. For example, $Y_0 <= Y_1 <= Y_2$. In some embodiments, for different values of subcarrier spacing, $Y_0$, $Y_1$ and/or $Y_2$ may be different.

Alternatively, in some embodiments, if the terminal device 130 detects BWP switching from DCI included in the fixed or configured PDCCH/CORESET in slot n, and if the resources in frequency domain of the new BWP indicated in the DCI fully overlaps the resources in frequency domain which are configured for the other PDCCHs/CORESETs, the terminal device 130 may start or resume the detection of all the first and other PDCCHs/CORESETs from slot n+$Y_0$. That is, the terminal device will not receive and/or transmit anything before slot n+$Y_0$. For example, if the fixed or configured PDCCH is the first PDCCH received from the first TRP 120-1 and the first PDCCH indicates the BWP switching from the first BWP to the second BWP in slot n, the terminal device 130 may start or resume reception of the first PDCCH/CORESET from the first TRP 120-2 after slot n+$Y_0$. In addition, if the resources in frequency domain of the new BWP indicated in the DCI fully overlaps the resources in frequency domain which are configured for the other PDCCHs/CORESETs, the terminal device 130 may start or resume reception of a second PDCCH/CORESET from the second TRP 120-2 after slot n+$Y_0$.

Alternatively, in some embodiments, if the terminal device 130 detects the BWP switching from DCI, the terminal device may ignore the BWP indicator field of DCI within a configured/fixed time period. For example, if the terminal device 130 receives, from the first TRP 120-1 or the second TRP 120-2, a third PDCCH indicating different BWP switching within a configured/fixed time period after the first PDCCH is received, the terminal device may ignore the BWP indicator field in the third PDCCH.

In some embodiments, if the terminal device 130 is configured with K times repetition of PUSCH transmission and/or PDSCH reception, and if different parameters of spatial domain filter or different parameters of Quasi-Co-Location (QCL) are configured for the repetition, the terminal device 130 may perform the transmission of PUSCH and/or the reception of PDSCH with the same spatial domain filter or QCL parameter firstly, and then repeat the transmission of PUSCH and/or reception of PDSCH with a different spatial domain filter or QCL parameter.

It can be seen that, according to embodiments of the present disclosure, some assumptions for BWP switching in multi-PDCCH based multi-TRP/panel transmission are provided. In this way, BWPs for multiple TRPs can always be aligned in multi-PDCCH based multi-TRP transmission.

Figure 6:
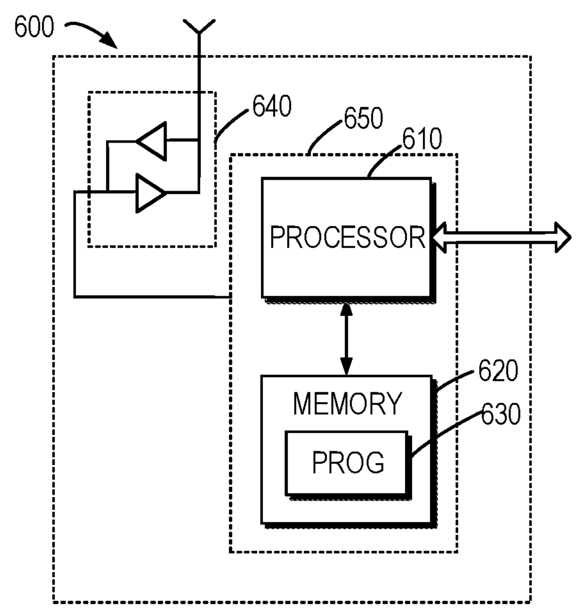
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the network device 110 or the terminal device 130 as shown in FIG. 1. Accordingly, the device 600 can be implemented at or as at least a part of the network device 110 or the terminal device 130.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a user equipment (UE), comprising:

receiving configuration of a first bandwidth part (BWP) and a second BWP, wherein the first BWP is configured for a first Transmission and Reception Point (TRP) and a second TRP, wherein the first TRP and the second TRP are respectively one of multiple TRPs in communication with the UE in a multi-TRP operation, and each of the first TRP and the second TRP is in communication with the UE within the first BWP, wherein different Physical Downlink Control Channels (PDCCHs) are respectively configured for the first TRP and the second TRP;

receiving from the first TRP, within the first BWP, a first PDCCH comprising a first Downlink Control Information (DCI) format scheduling the UE for the first TRP, wherein, a second PDCCH, comprising a second DCI format scheduling the UE for the second TRP, is received from the second TRP within the first BWP, the first DCI format comprises a field indicating a BWP switching from the first BWP to the second BWP, the UE is scheduled within the second BWP from the first TRP and the second TRP, after switching from the first BWP to the second BWP; and receiving from the first TRP, within the second BWP, a third PDCCH for the first TRP, wherein a fourth PDCCH for the second TRP is received from the second TRP within the second BWP.

2. The method of claim 1, further comprising:

in response to failing to receive the second PDCCH from the second TRP, switching the first BWP to the second BWP; and suspending communication between the second TRP and the UE.

3. The method of claim 1, further comprising:

in response to expiration of a BWP inactivity timer, resuming the communication between the second TRP and the UE on a default BWP; and switching the second BWP used for the communication between the first TRP and the UE to the default BWP.

4. The method of claim 1, further comprising:

in response to failing to receive the second PDCCH from the second TRP, continuing to communicate with the first and second TRPs on the first BWP.

5. The method of claim 1, wherein the second DCI format comprises a BWP switching from the first BWP to a third BWP, and the UE is scheduled within the second BWP from the first TRP and the second TRP, after switching from the first BWP to the second BWP.

6. A method implemented at a network device, comprising:

transmitting to a User Equipment (UE), configuration of a first bandwidth part (BWP) and a second BWP, wherein the first BWP is configured for a first Transmission and Reception Point (TRP) and a second TRP, wherein the first TRP and the second TRP are respectively one of multiple TRPs in communication with the UE in a multi-TRP operation, and each of the first TRP and the second TRP is in communication with the UE within the first BWP, wherein different Physical Downlink Control Channels (PDCCHs) are respectively configured for the first TRP and the second TRP;

transmitting to the UE, within the first BWP, a first PDCCH comprising a first Downlink Control Information (DCI) format scheduling the UE for the first TRP, wherein, a second PDCCH, comprising a second DCI format scheduling the UE for the second TRP, is transmitted to the UE within the first BWP, the first DCI format comprises a field indicating a BWP switching from the first BWP to the second BWP, and the UE is scheduled within the second BWP from the first TRP and the second TRP, after switching from the first BWP to the second BWP; and transmitting to the UE, within the second BWP, a third PDCCH for the first TRP, wherein a fourth PDCCH for the second TRP is transmitted to the UE within the second BWP.

7. The method of claim 6, wherein, in response to the UE failing to receive the second PDCCH from the second TRP, the UE switches the first BWP to the second BWP, and the UE suspends communication between the second TRP and the UE.

8. The method of claim 6, further comprising:

in response to expiration of a BWP inactivity timer, communication between the second TRP and the UE is resumed on a default BWP; and the second BWP used for the communication between the first TRP and the UE is switched to the default BWP.

9. The method of claim 6, wherein, in response to the UE failing to receive the second PDCCH from the second TRP, the UE continues to communicate with the first and second TRPs on the first BWP.

10. The method of claim 6, wherein the second DCI format comprises a BWP switching from the first BWP to a third BWP, and the UE is scheduled within the second BWP from the first TRP and the second TRP, after switching from the first BWP to the second BWP.

11. A network device, comprising a transmitter configured to:

transmit to a User Equipment (UE), configuration of a first bandwidth part (BWP) and a second BWP, wherein the first BWP is configured for a first Transmission and Reception Point (TRP) and a second TRP, wherein the first TRP and the second TRP are respectively one of multiple TRPs in communication with the UE in a multi-TRP operation, and each of the first TRP and the second TRP is in communication with the UE within the first BWP, wherein different Physical Downlink Control Channels (PDCCHs) are respectively configured for the first TRP and the second TRP;

transmit to the UE, within the first BWP, a first PDCCH comprising a first Downlink Control Information (DCI) format scheduling the UE for the first TRP, wherein, a second PDCCH, comprising a second DCI format scheduling the UE for the second TRP, is transmitted to the UE within the first BWP, the first DCI format comprises a field indicating a BWP switching from the first BWP to the second BWP, and the UE is scheduled within the second BWP from the first TRP and the second TRP, after switching from the first BWP to the second BWP; and transmit to the UE, within the second BWP, a third PDCCH for the first TRP, wherein a fourth PDCCH for the second TRP is transmitted to the UE within the second BWP.

12. The network device of claim 11, wherein, in response to the UE failing to receive the second PDCCH from the second TRP, the UE switches the first BWP to the second BWP, and the UE suspends communication between the second TRP and the UE.

13. The network device of claim 12, further comprising:

in response to expiration of a BWP inactivity timer, communication between the second TRP and the UE is resumed on a default BWP; and the second BWP used for the communication between the first TRP and the UE is switched to the default BWP.

14. The network device of claim 12, wherein, in response to the UE failing to receive the second PDCCH from the second TRP, the UE continues to communicate with the first and second TRPs on the first BWP.

15. The network device of claim 12, wherein the second DCI format comprises a BWP switching from the first BWP to a third BWP, and the UE is scheduled within the second BWP from the first TRP and the second TRP, after switching from the first BWP to the second BWP.

* * * * *